United States Patent

Mapel

[15] 3,635,611
[45] Jan. 18, 1972

[54] LOCKING DEVICE FOR TIRE MOLD CLAMPING BAND

[72] Inventor: William S. Mapel, Niles, Mich.
[73] Assignee: National-Standard Company, Niles, Mich.
[22] Filed: Mar. 30, 1970
[21] Appl. No.: 23,589

[52] U.S. Cl...............................425/47, 425/450
[51] Int. Cl........................................B29c 1/16
[58] Field of Search..............18/2 TC, 2 TM, 16 T, 17 T, 18/17 K, 17 W, 18 F, 30 LT; 249/160–162, 164, 167

[56] References Cited

UNITED STATES PATENTS 2,916,772  12/1959  McDonald...............................18/43
3,484,903  12/1969  Rawls......................................18/43

Primary Examiner—J. Spencer Overholser
Assistant Examiner—Donald M. Gurley
Attorney—Johnson, Dienner, Emrich, Verbeck & Wagner

[57] ABSTRACT

A locking device for securing a clamping band in locking engagement around a tire mold including a power cylinder assembly for opening and closing the opposite ends of the band and a guiding assembly for urging the ends of the band towards the tire mold as they are spread apart by a piston and cylinder assembly and simultaneously urging the portion of the band diagonally opposite to the ends away from the tire mold to completely disengage the band from the tire mold.

17 Claims, 8 Drawing Figures

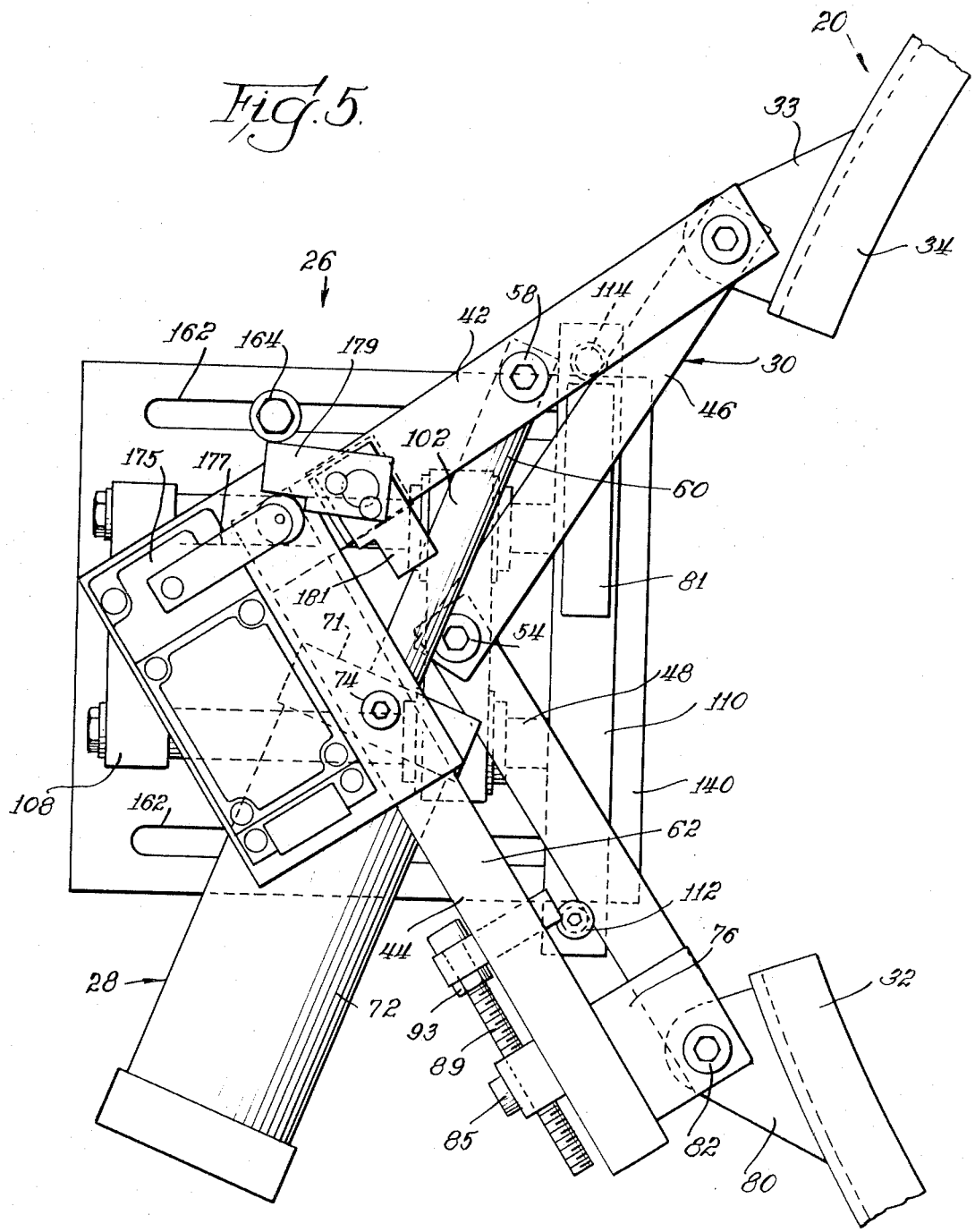

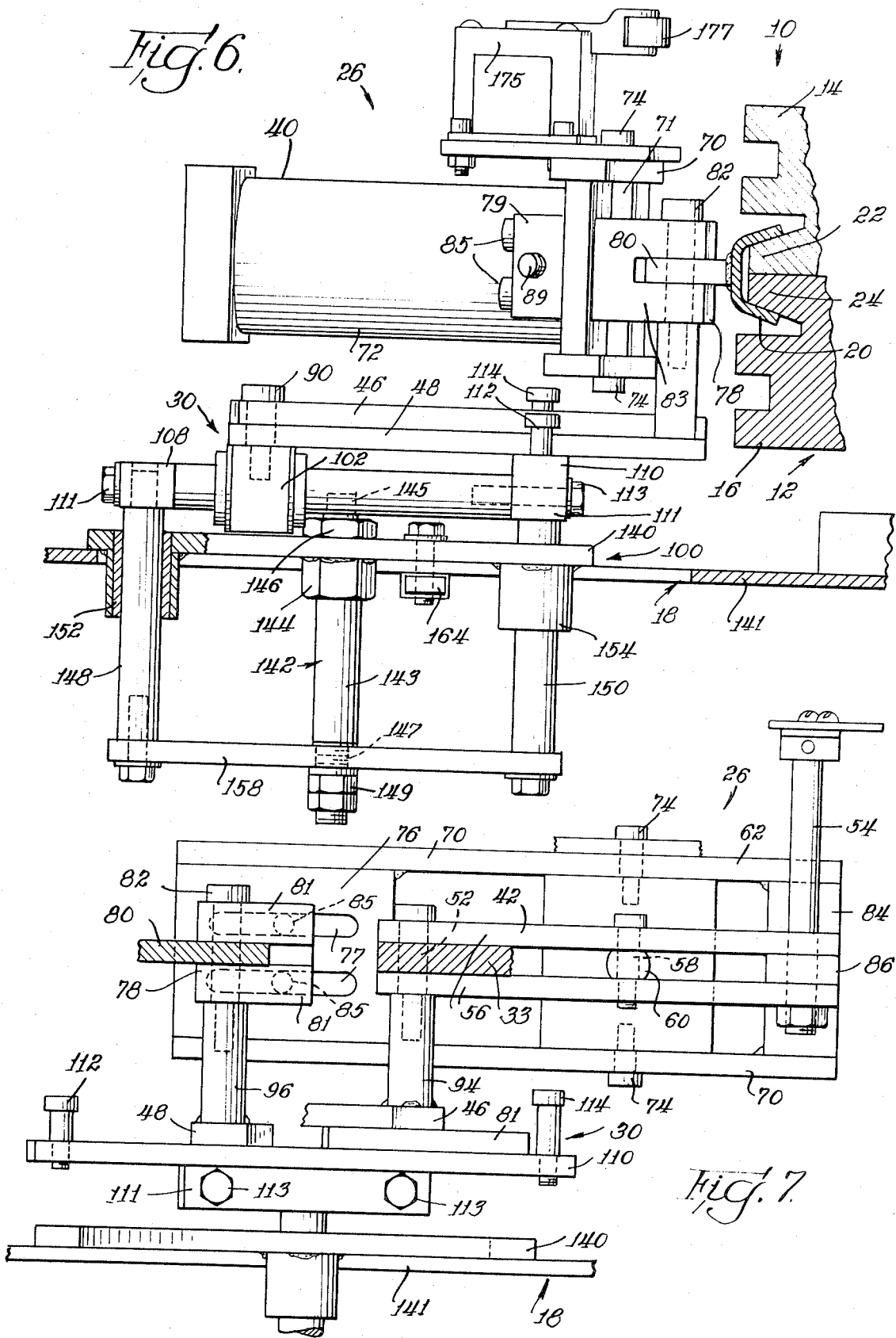

LOCKING DEVICE FOR TIRE MOLD CLAMPING BAND

BACKGROUND OF THE INVENTION

This invention relates to a locking device for a clamping band which can be operated to open and close the clamping band around a tire vulcanizing mold. In designing a locking device for a tire mold clamping band, it is important that the locking device in opening the clamping band causes the clamping band to completely disengage from its contact with the tire mold. Otherwise, it will not be possible for the tire mold to properly open at the selected time.

Accordingly, one of the objects of this invention is to provide a locking device for a tire mold clamp band which includes a power operated assembly for opening and closing the opposite ends of the band and a guiding assembly for urging the ends of the band towards the tire mold as they are spread apart to completely disengage the band from the tire mold and to simultaneously urge the portion of the band diagonally opposite to the ends away from the tire mold.

Another object of this invention is to provide a locking device for a tire mold clamp band having a power-operated assembly for opening and closing the band and a guiding assembly for disengaging the band from the tire mold as the power-operated assembly opens the band, wherein the locking device includes means for adjusting both the power-operated assembly and guiding assembly to accommodate various sizes of tire molds.

A further object of this invention is to provide a locking device for securing a clamping band around a tire mold having a power operated assembly for opening and closing the band and a guiding assembly for disengaging the band from the tire mold as the power-operated assembly opens the ends of the band, and a three-positioned electrical switch which is closed in two different directions whenever the power-operated assembly moves to its two limit positions.

A still further object of this invention is to provide a locking device for securing a clamping band around a tire mold having a power-operated assembly for opening and closing the ends of the band and a guiding assembly for positioning the sides of the band into and out of contact with the tire molds, which guiding assembly includes means for supporting and guiding the portion of the band diametrically opposite to the ends of the band radially away and toward the tire mold.

Further objects and advantages of the present invention will become apparent as the following specification proceeds and the features of novelty which characterize the invention will be pointed out with particularity in the claims annexed to and forming a part of the specification.

DESCRIPTION OF THE DRAWING

FOr a better understanding of this invention, reference may be had to the accompanying drawing, in which:

FIG. 5 is a view identical to FIG. 2 showing the arrangement of parts of the locking device in the fully open position;

FIG. 6 is a side elevational view of the portion of the locking device of this invention illustrated in FIG. 2 and a partial view of the clamping band on a tire mold;

FIG. 7 is a partial front view of the FIG. 2 illustration looking in a direction away from the ends of the clamping band.

DESCRIPTION OF PREFERRED EMBODIMENT

Figure 8:
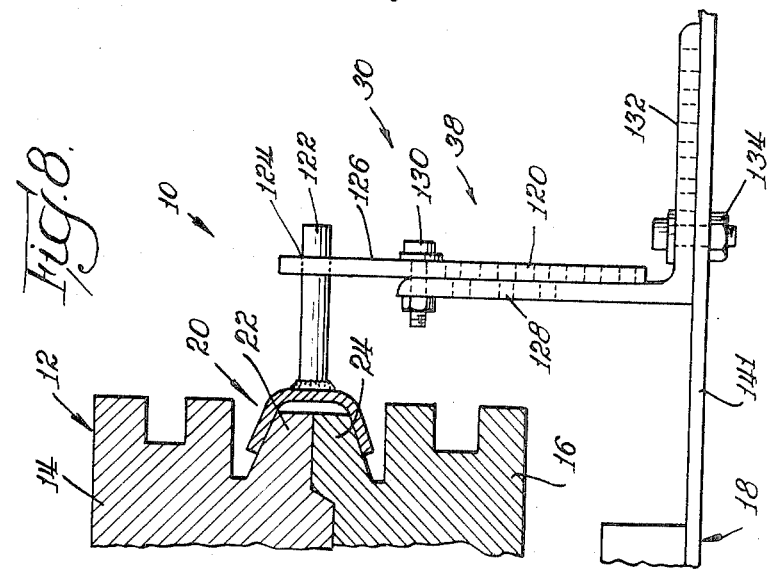
FIG. 8 is a side elevational view of FIG. 1 showing the back portion of the locking device of this invention.

There is partially shown in FIGS. 6 and 8, a tire mold machine, generally designated by a reference numeral 10, having a tire mold 12 (partially shown in FIGS. 6 and 8) with upper and lower mold half-sections 14 and 16. The tire mold 12 is mounted on a base or cabinet, generally designated by the reference numeral 18 (FIGS. 6 and 8). The tire mold 12 is only partially illustrated in the drawing since it is representative of a conventional tire vulcanizing mold having upper and lower mold half-sections, and forms no part of this invention. To insert a tire carcass into the center of the mold 12, the upper mold half-section 14 is adapted to either swing to a substantially vertical position by means of a hinge arrangement (not shown) or to be lifted vertically by some power-operated means. After the tire carcass is inserted into the lower mold half-section 16 of the tire mold 12, the upper mold half-section 14 is moved downwardly until it seats on the lower mold half-section 16.

To hold the two sections 14, 16 of the tire mold 12 into firm engagement during the vulcanizing process, a clamping band 20 (see FIG. 1) is provided which fits snugly around substantially the entire periphery of the adjoining flanges 22 and 24, respectively, of upper and lower mold half-sections 14 and 16 (see FIGS. 6 and 8). A locking device, generally designated by the reference numeral 26 and incorporating the principles of this invention, is provided to position the clamping band 20 about flanges 22 and 24 and to thereafter lock clamping band 20 in place.

The locking device 26 of this invention comprises a power-operated assembly 28 for spreading apart and closing together the ends 32 and 34 of clamp band 20, and a guiding assembly 30 for urging the clamping band 20 away from and into engagement with the mold 12 as the ends 32, 34 of the band 20 are, respectively, spread apart and closed together. As will be explained in more detail hereinafter, the guiding assembly 30 comprises a front guiding portion 36 for guiding the forward end of the clamp band 20 towards the tire mold 12 as the two ends 32, 34 spread apart, and a rearward guiding portion 38 (FIG. 8) for guiding the rearward end of the clamp band 20 away from the tire mold 12 as the clamp band 20 is opened.

The power-operated assembly 28 comprises an air piston and cylinder unit 40, which is interconnected to the ends 32, 34 of the clamp band 20 by means of a toggle link member 42 and a power-transmitting link member 44. The toggle link member 42 has one end connected to an ear 33 on the end 34 of clamp band 20 by means of a pivot pin 52 and has its opposite end pivotally connected to power-transmitting link member 44 by means of pivot pin 54. As illustrated in fIG. 7, the toggle link 42 has a pair of parallel spaced apart bars 56 having a pivot pin 58 extending through aligned apertures in their middle portions for receiving pivot pin 58 coupled to the outer end of piston rod 60 of the air piston and cylinder unit 40 to receive pivot pin 58 for pivotally coupling the outer end of piston rod 60 of the air piston and cylinder unit 40. The power-transmitting link 44 comprises an elongated middle portion 62 and two end segments 64, 68. The middle portion 62 comprises two parallel spaced-apart bars 70 (FIG. 7), which are separated a sufficient distance to pivotally support the forward end 71 of the air cylinder 72 (FIG. 7) of air piston and cylinder unit 40 by means of upper and lower pivot pins 74. The end segment 64 is adjustably mounted on a block 76 secured between the pairs of elongated bars 70, by such means as welding, and having a pair of parallel slots 77 (FIG. 6). The end segment 64 has a block 79 with two ears 81 projecting into slots 77 and a mating block 83 which can be lockingly coupled to block 79 by two set screws 85 (FIG. 6) that project through ears 81 and are screwed into aligned threaded apertures in block 83. Mating block 83 has a bifurcated end 87 with opening formed therein for receiving a pivot pin 82 to pivotally coupled end segment 64 to ear 80 of end 32 of clamping band 20.

Figure 2:
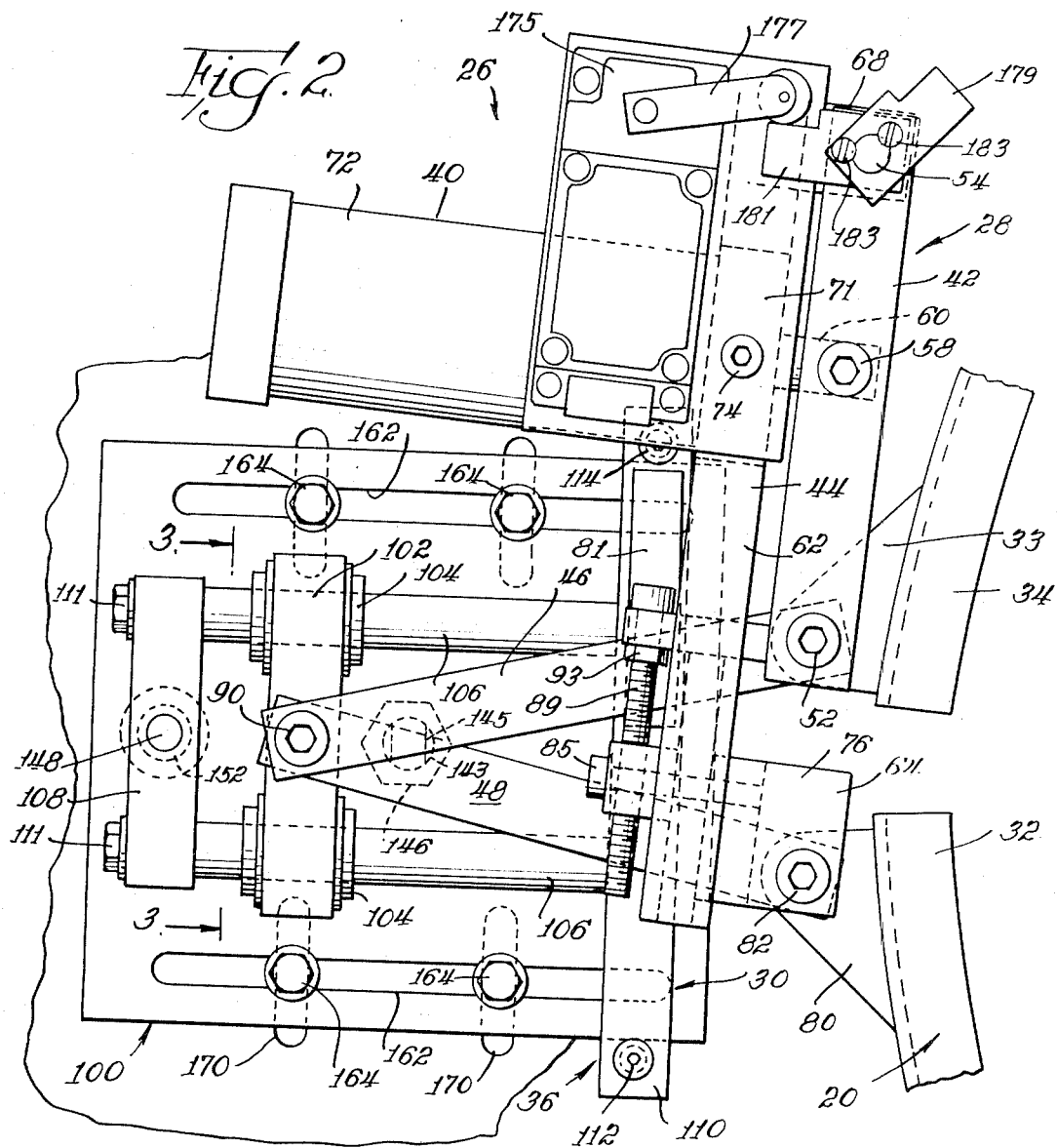
FIG. 2 is a partial enlarged view of FIG. 1 illustrating the front portion of the locking device of this invention connected to the ends of the clamping band.

The position of end segment 64 along the length of middle portion 62 can be varied by turning a threaded bolt 89 (FIG. 2) projecting through an opening in a metal block 91 secured between the pair of bars 70. The purpose of this adjustment feature is to select the proper separating distance between ends 32 and 34 to insure the clamping band 20 is in locktight engagement with flanges 22, 24 of upper and lower mold half-sections 14, 16 when the power operated assembly 28 is moved to the locked position, as represented in FIG. 2. It would of course only be necessary to make this adjustment once for each change of tire molds 12. Once this adjustment is determined, lock nut 93 is tightened on threaded bolt 89 and set screws 85 are tightened.

The other end segment 68 is provided by a block 84 (FIG. 7) secured between the ends of a pair of bars 70 and has an outer projecting ear 86 which is received between the pair of bars 56 of toggle link 42 and is pivotally secured to toggle link 42 by pivot pin 54.

As the power-operated assembly 28 is actuated in a direction to spread apart the ends 32, 34 of clamp band 20, it is important that the ends 32, 34 spread apart evenly and the entire periphery of the band 20 disengages from the upper and lower flanges 22, 24 of tire mold 12. To this end, a guide assembly 30 is provided, having a forward guide unit 36 (FIG. 2) and a rear guide unit 38 (FIG. 8).

The forward guide unit 36 is assembled on an adjustable base 100 (FIG. 6) that is mounted on the pedestallike cabinet 18 to which is mounted tire mold 12. The front guide unit 36 includes a carriage member 102 having a pair of bearing members 104 adapted to ride on a pair of parallel guide rods 106 towards and away from the tire mold 12.

A pair of guide link members 46 and 48 are pivotally connected together at one end by a pivot pin 90 threaded into the center of carriage member 102, and at their end are pivotally connected, respectively, to ears 33, 80. The forward end of guide link member 46 (FIG. 7) slides across way 81 and is coupled to pivot pin 52 by means of upright post 94 fastened to the forward end of guide link member 46, where post 94 has a threaded socket in its upper end to receive the lower threaded end of pivot pin 52. Guide link member 48 is likewise coupled to pivot pin 82 by means of upright post 96 fastened, as by welding, to its forward end, where post 96 has a threaded socket in its upper end to receive the lower threaded end of pivot pin 82.

The pair of parallel guide rods 106 are supported in a fixed spatial relation to front and rear mounting blocks 108, 109 by means of a pair of front and rear threaded bolts 111, 113, which project through the front and rear mounting blocks 108, 109, respectively, and screw into the opposite ends of threaded sockets in guide rods 106.

Figure 3:
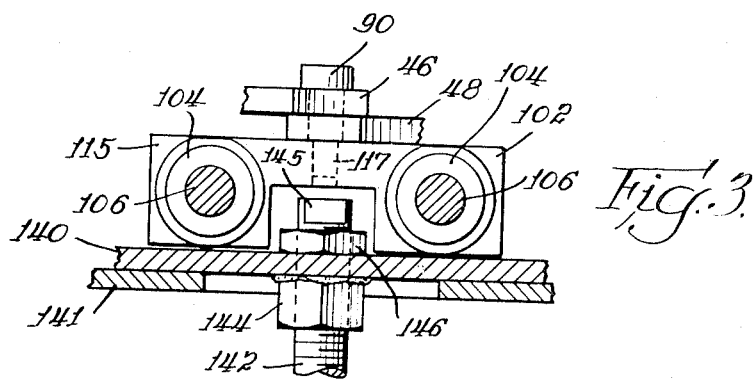
FIG. 3 is an end view taken along the line 3—3 of FIG. 2.

The carriage member 102 is formed on a U-shaped block 115 (FIG. 3) having a pair of cylindrical openings for receiving bearing members 104, for example linear motion ball bearings and having a threaded socket 117 in the center of its top surface for receiving the lower threaded end of pivot pin 90.

The function of the carriage member 102 riding along the guide rods 106 is to cause the guide link members 46, 48 and the ends 32, 34 of clamp band 20 to spread apart evenly as the power-operated assembly 28 moves to an open position. As the ends 32, 34 of clamp band 20 are being spread apart, a second guide means is provided by the forward guide portion 36 to urge the ends 32, 34 of clamping band 20 to move towards the clamp band 20 with the result that the diagonally opposite portion of the clamping band 22 is radially urged away from the tire mold 12 to free the entire periphery of the clamping band 20 from engagement with the flanges 22, 24. This second guide means is provided by a pair of stop lugs 112, 114 extending upright from the opposite ends of mounting bar 110.

As depicted in FIG. 5, the guide link members 46, 48 are spread apart by the power-operated assembly 28 to open the ends 32, 34 of the clamping band 20, causing the carriage member 102 to move towards the tire mold 12. When the clamping band ends 32, 34 approach their fully open position, the outer edges of the guide link members 46, 48 strike and ride along respectively the stop lugs 112 and 114 with the result that the ends 32, 34 of clamping band 20 are urged towards the tire mold 12.

The rear guide portion 38 of guide assembly 30, as illustrated in FIG. 8, comprises a stand 120 and a slide member 122, which extends perpendicular from the clamping band 20 at diagonally opposite position from the ends 32, 34. The stand 120 has an aperture 124 formed at the upper end of its upright leg portion which is slightly larger in diameter than the diameter of the cylindrical rod forming slide member 122 slidably received therein. When the ends 32, 34 of clamping band 20 are urged toward the tire mold 12 by the engagement of guide link members 46, 48 with stop lugs 112, 114, the diagonally opposite portion of the clamping band 20 is urged away from the tire mold 12 and the sliding member 122 slides through the aperture 124 of stand 120 to positively guide this diagonally opposite portion of the clamp band 20 in a radial outward direction away from the flanges 22, 24.

To accommodate various sizes of tire molds 12, the stand 120 for the rear guide portion 38 has a provision for adjusting both the height and diameter position of the rear guide portion 38. The vertical adjustment is provided by the cooperating slidingly engaged legs 126, 128 having aligned apertures which are locked together in place by a set of clamp bolts 130. The diameter adjustment is provided by a plurality of mounting apertures along the base leg 132 of the stand 120 which are mounted to the tire mold cabinet 18 by means of clamp bolt 134.

The front guide portion 36 of guide assembly 30 is adjustably mounted to the cabinet 18 to permit it to be adjusted as to height, diameter, and angular orientation to accommodate various sizes of tire molds 12.

The base 100 for the front guide portion 30 includes a baseplate 140 adjustably mounted to base panel 141 of cabinet 18 by means of four clamp bolts 164. Two clamp bolts 164 project through each of parallel elongated slot 162 formed in baseplate 140, and each clamp bolt 164 projects through one of the four cross slots 170 in base panel 141. Before the clamp bolts are tightened, the baseplate 140 can be slid towards or away from tire mold 12 with elongated slots 162 being moved relative to clamp bolts 164 for a diametrical adjustment, and the baseplate 140 and clamp bolts 164 can be moved relative to cross slots 170 for a lateral adjustment of front base portion 36 relative to tire mold 12. After baseplate 140 is correctly adjusted in both directions, each of clamp bolts 164 are tightened into locking engagement.

Vertical adjustment of base 100 is provided by adjustable leg member 142 which varies the vertical position of guide posts 148 and 150 relative to base panel 141. Posts 148 and 150, whose upper ends are secured to center lower surface of mounting blocks 111 and 113, respectively, and whose lower ends are secured to horizontal plate 158, are slidably inserted through sleeves 152 and 154, respectively. Adjustable leg member 142 comprises a threaded bolt 143 with a flat head 145 upper end for turning and a reduced lower shank portion 147 rotatably held in an opening in plate 158 by means of a retainer member 149, and a nut 144 secured, as by welding, to the lower surface of baseplate 140. Threaded bolt 143 is screwed through nut 144 to vary the vertical height of plate 158 and once moved to a selected position is locked in place by lock nut 146. Thus, it can be seen by turning threaded bolt 143 the guide posts 148, 150 can be moved either up or down to adjust the height of guide posts 106 relative to base panel 141.

One of the novel features of this invention is the inclusion of a three-positioned electrical switch 175 which is actuated by the operation of the locking device 26. The electrical switch 175 could be any conventional three-position normally opened, electrical switch having a contact arm 177. The electrical switch 175 is mounted on the upper bar 70 of power-transmitting link member 44 such that its actuating arm 177 extends towards the pivot pin 54. Mounted on the top of the pivot pin 54 are two actuating levers 179, 181, which are angularly positioned relative to the pivot pin 54 by setscrews 183. The setscrews 183 are angularly oriented such that the actuating lever 181 engages and pushes in one direction contact arm 177 of electrical switch 175 to close a first switch contact when the power operating assembly 28 is in the closed position (FIG. 2), and actuating lever 179 engages and pushes the contact arm 177 in the opposite direction to close a second switch contact when the power operating assembly 26 is in the open position (FIG. 5).

The addition of the electrical switch 175 and its novel cooperation with the locking device 26 provides an important step in building a complete programming control unit for automatically vulcanizing a tire carcass. The engagement and actuation of contact arm 177 to close a first switch contact by lever 181 upon the locking device 26 being moved to the closed position could be used to initiate the vulcanizing cycle by introducing air into the tire carcass inner tube or inflated bag. When the locking device 26 is being moved to the opened position, the lever arm 179 closes a second switch contact which could be used to send an electrical signal for operating the air cylinder to open tire mold 12.

Figure 4:
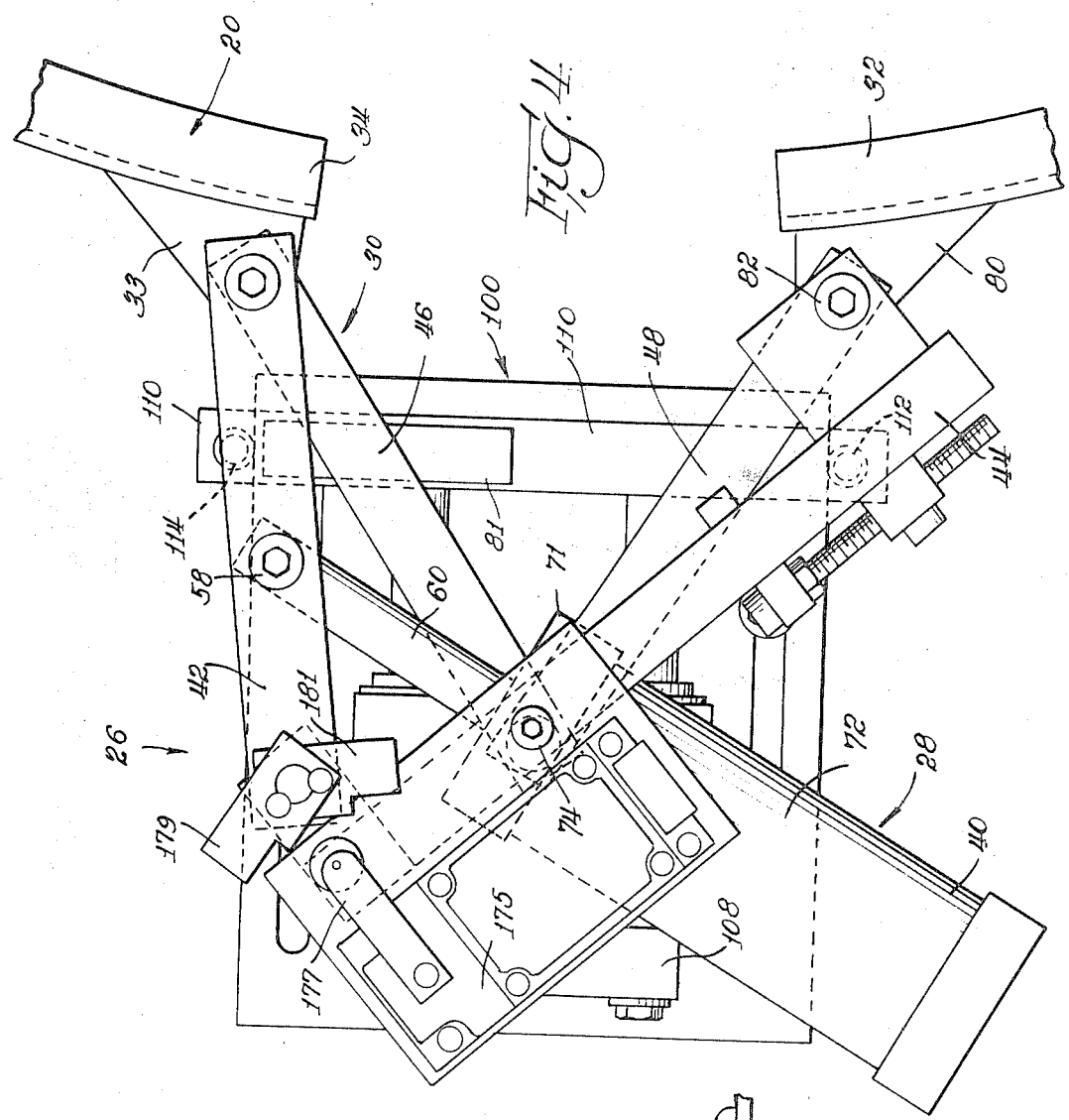
FIG. 4 is an identical view to FIG. 2 showing the arrangement of parts of the locking device in the partially opened position.

There is illustrated in FIGS. 2, 4, and 5 the relative position of the parts of locking device 26 with the clamping band 20 in the closed, half-opened, and spread apart positions, respectively. The power-operated assembly 28 is moved to a locking position when the clamping band 20 is in its closed position by virtue of the fact that the toggle link 42 is in an overcentered position relative to the pivot pins 52 and 82. With the toggle link member 42 in this overcentered position, it is impossible for the clamping band 20 to become opened.

At the end of the vulcanizing cycle, air is introduced into the cylinder 72 of piston and cylinder unit 40 in a direction to cause the piston rod 60 to be driven out of the air cylinder 72. The outward force of the piston rod 60 urges the power-transmitting link 44 and the toggle link member 42 to pivot away from each other about the pivot pin 54 with the result that the toggle link member 42 is swung over center to release its locking hold on the ends 32, 34 of clamping band 20. As depicted in FIG. 4, as the piston 60 continues to expand outwardly, the power-transmitting link member 44 and toggle link member 42 continue to swing away from each other about the pivot pin 54 causing the ends 32, 34 of clamping band 20 to spread apart from each other. As these ends 32, 34 spread apart, the guide link members 46, 48 are spread apart about their common pivot pin 90 and simultaneously are driven toward the ends 32, 34 to insure that the ends 32, 34 spread evenly as they open.

As the power-operated assembly 28 drives the ends 32, 34 of clamping band 20 to their lowest spread-apart position (see FIG. 5), the elongated outer edges of guide link members 46, 48 engage and slide along stopping studs 112, 114 with the result that the guide link members 46, 48 are urged towards the tire mold 12 causing the ends to be also urged towards the tire mold 12. This radial inward movement of the ends 32, 34 cause their diametrically opposite back portion to be urged away from the tire mold 12, and thereby permits the entire peripheral surface of the clamping band 20 to become disengaged from the upper and lower flanges 22, 24 of tire mold 12.

Figure 1:
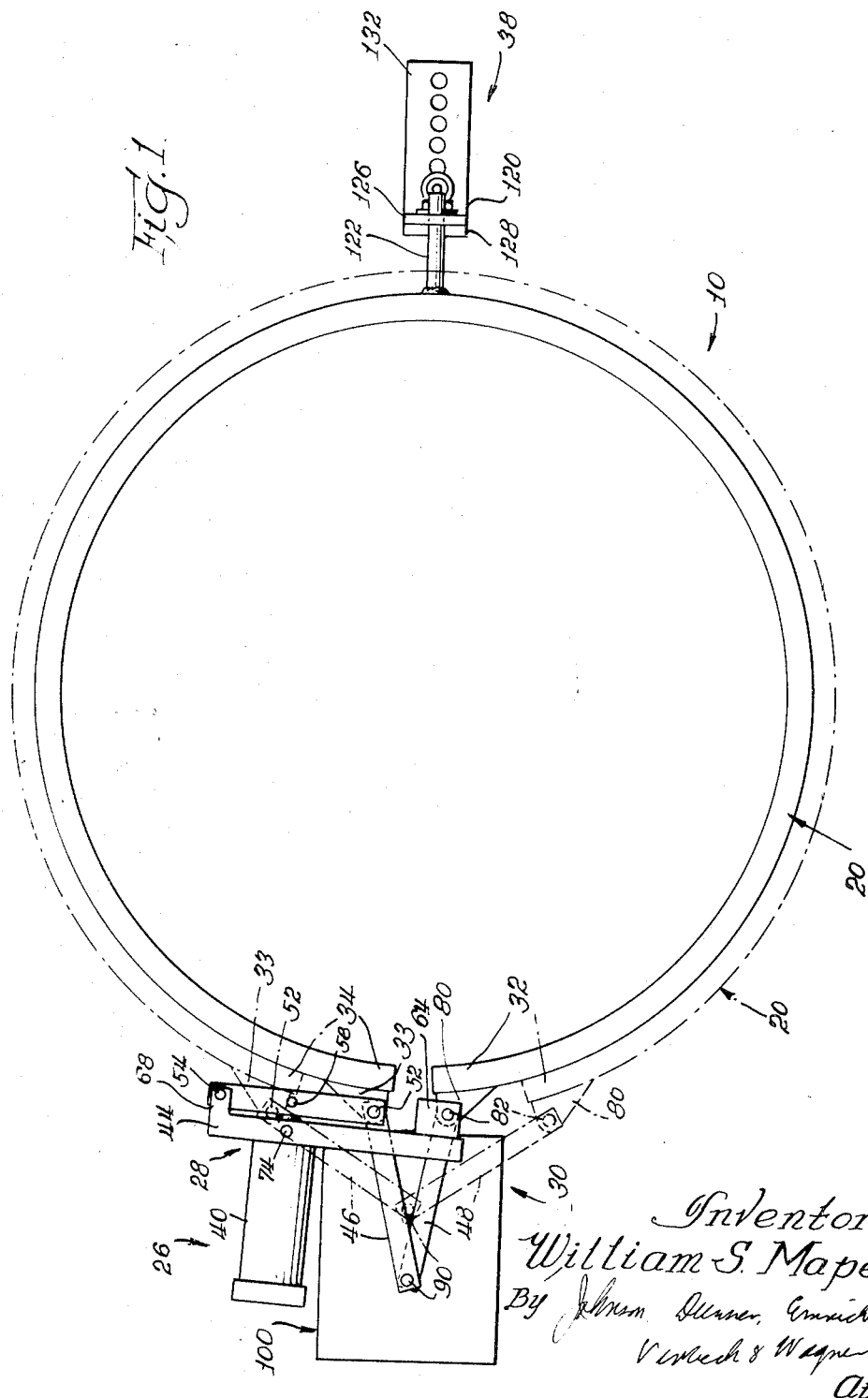
FIG. 1 is a plan view of the preferred embodiment of this invention illustrated with a clamping band.

It can be appreciated that the movement of the clamping band 20 relative to the tire mold 12 between its engaged and disengaged positions is a relatively small distance. This relative distance is illustrated in FIG. 1, where the solid lines represent the clamping band 20 in the engaged locking position and the dotted lines represent the clamping band in the disengaged position.

I claim:

1. A locking device for a clamping band adapted to hold together the adjoining flanges of opposing mold half-sections of a tire mold comprising a clamping band extending around substantially the entire periphery of said mold half-sections, first and second spread link members having one end of each pivotally connected to the two ends of the clamping band, guide means for guiding the other end of each of said spread link members towards and away from the tire mold to cause said ends of the clamping band to spread apart and come together evenly, a toggle link member pivotally connected at one end to one of said ends of the clamping band, and means for swinging the other end of said toggle link member toward said clamping band through an overcentered position relative to the pivotal connection of said first and second link members causing said ends of the clamping band to move, respectively, between spread-apart position and a clamping position.

2. A locking device as defined in claim 1, further comprising a second guide means for urging said ends of the clamping band towards the tire mold as said ends approach said spread-apart position.

3. A locking device as defined in claim 2, further comprising a third guide means for guiding the portion of the clamping band which is diametrically opposite to said ends in a radial outward direction from the tire mold.

4. A locking device as defined in claim 1, wherein said means for swinging said toggle link member includes a power-transmitting link member having one end pivotally connected to an end of said toggle link member opposite to said one end of said toggle link member and having another end pivotally connected to the other of said ends of said clamping band, and a piston and cylinder unit having the piston pivotally connected to the middle portion of one of said toggle and power-transmitting link members and having the cylinder fixedly mounted to the middle portion of the other of said toggle and power-transmitting members.

5. A locking device as defined in claim 4, further comprising length adjusting means to vary the length of said power-transmitting link member between its pivotally connected ends to correctly set the spacing between said ends of the clamping band in said clamping position so that the clamping band will seat on the adjoining flanges of the tire mold half-section to provide a locktight engagement.

6. A locking device as defined in claim 4, further comprising a three-position, normally opened electrical switch mounted on said power-transmitting link member and having a switch arm extending towards said toggle link which closes a first switch contact when actuated in one direction and a second switch contact when actuated in the opposite direction, and first and second switch actuating means carried by said toggle link member and disposed relative to said electrical switch arm such that said first actuating means contacts, said switch arm to close said first switch contact upon said toggle link member moving to said unlocked position and said second switch actuating means contacts said switch arm to close said second switch contact upon said toggle link member moving to said locked position.

7. A locking device for a clamping band adapted to hold together the adjoining flanges of opposing mold half-sections of a tire mold comprising a clamping band extending around substantially the entire periphery of said mold half-sections, first and second spread link members having one end of each pivotally connected to the ends of the clamping band, carriage means for pivotally supporting the other end of each of said spread link members, track means for guiding said carriage means towards and away from said ends of the clamping band, a toggle link member pivotally connected at one end to one of said ends of the clamping band, and means for swinging the other end of said toggle link member toward said clamping band through an overcentered position relative to the pivotal connection of said first and second link members causing said ends of the clamping band to move, respectively, between a spread-apart position and a clamping position.

8. A locking device as defined in claim 7, further comprising a second guide means for urging said ends of the clamping band towards the tire mold as said ends approach said spread-apart position.

9. A locking device as defined in claim 8, further comprising a third guide means for guiding the portion of the clamping band which is diametrically opposite to said ends in a radial outward direction from the tire mold.

10. A locking device as defined in claim 7, wherein said means for swinging said toggle link member includes a power-transmitting link member having one end pivotally connected to an end of said toggle link member opposite to said one end of said toggle link member and having another end pivotally connected to the other of said ends of said clamping band, and a piston and cylinder unit having the piston pivotally connected to the middle portion of one of said toggle and power-transmitting link members and having the cylinder fixedly mounted to the middle portion of the other of said toggle and power-transmitting members.

11. A locking device as defined in claim 10, further comprising length adjusting means to vary the length of said power-transmitting link member between its pivotally connected ends to correctly set the spacing between said ends of the clamping band in said clamping position so that the clamping band will seat on said adjoining flanges of the tire mold half-section to provide a locktight engagement.

12. A locking device as defined in claim 7, wherein said track means comprises two parallel guide rods mounted between two blocks and extending towards said ends of said clamping band, and wherein said carriage means comprises a block member having two parallel cylindrical bores spaced apart a distance equal the distance separating said guide rods and a pair of bearing members seated in said cylindrical bores and having an internal diameter slightly larger than the diameter of said guide rods.

13. A locking device as defined in claim 7, further comprising a means for varying the height of said track means relative to the tire mold to accommodate various sizes of tire molds.

14. A locking device as defined in claim 7, further comprising a means for selectively positioning said track means towards and away from the tire mold to accommodate various sizes of tire molds.

15. A locking device as defined in claim 10, further comprising a three-position, normally opened electrical switch mounted on said power-transmitting link member and having a switch arm extending towards said toggle link which closes a first switch contact when actuated in one direction and a second switch contact when actuated in the opposite direction, and first and second switch actuating means carried by said toggle link member and disposed relative to said electrical switch arm such that said first actuating means contacts said switch arm to close said first switch contact upon said toggle link member moving to said unlocked position and said second switch actuating means contacts said switch arm to close said second switch contact upon said toggle link member moving to said locked position.

16. A locking device as defined in claim 8, wherein said second guide mans includes a pair of stop pins disposed in the plane of said spread link members and on their outer surfaces, said stop pins being spaced apart an equal distance from the adjacent guide link member and positioned to be engaged by the outside edge of said adjacent guide link member as said ends of the clamping band approach said spread-apart position to urge said ends towards the tire mold as said guide link members continue to be spread apart.

17. A locking device as defined in claim 9, wherein said third guide means comprises a slide member extending in a radially outward direction from the clamping band at a diametrically opposite position from said ends and a stand for the tire mold having an upright leg portion with an opening in direct alignment with said slide member for slidably receiving said slide member therethrough.

* * * * *